(12) United States Patent
Da

(10) Patent No.: US 6,636,744 B1
(45) Date of Patent: Oct. 21, 2003

(54) OBTAINING PILOT PHASE OFFSET TIME DELAY PARAMETER FOR A WIRELESS TERMINAL OF AN INTEGRATED WIRELESS-GLOBAL POSITIONING SYSTEM

(75) Inventor: Ren Da, Bernards Township, Somerset County, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/552,898

(22) Filed: Apr. 20, 2000

(51) Int. Cl.[7] .............................................. H04Q 7/20
(52) U.S. Cl. ................................ 455/456.1; 455/67.11; 455/67.16; 701/213; 701/214; 342/357.06; 342/357.09
(58) Field of Search ..................... 342/357.01, 357.06, 342/357.09, 386, 450, 457, 458, 464; 455/67.1, 456; 701/213, 214

(56) References Cited

U.S. PATENT DOCUMENTS 5,406,275 A * 4/1995 Hassett et al. ............... 340/933

(List continued on next page.)

FOREIGN PATENT DOCUMENTS

WO      WO 99/61934      12/1999      ............. G01S/5/14

OTHER PUBLICATIONS

"Analystical Approach For Multipath Delay Spread Poer Distribution", S. Y. Lien and M. Cherniakov, IEEE Global Telecommunications Conference, US, New Ork, IEEE, 1998, pp. 3680–3685.

(List continued on next page.)

Primary Examiner—William Trost
Assistant Examiner—James D. Ewart

(57) ABSTRACT

An integrated wireless-global positioning system determines the location of a wireless terminal from satellite measurements and wireless network measurements. The accuracy of the location identified is dependent upon the quality of the measurement from the wireless network which, unfortunately, can contain measurement errors such as biases. Biases are caused by time delays which occur during the processing and transmission of signals. The time delays vary for each sector/base station and for each type of wireless terminal model being used. Calibration of these biases is important for the success of the integrated wireless global positioning system. For a small network system which has only a handful of base stations/wireless terminals, a specific system to calibrate the time delays for each base station and/or wireless terminal can be set up. The approach is, however, costly, time consuming, and subject to many errors. It is not feasible for a large scale, commercial system where hundreds of base stations and dozens of different types of wireless terminals are involved. This invention is a method of using an integrated wireless global positioning system to obtain pilot phase offset delay parameters, to continuously improve the quality of the values obtained, and to adaptively adjust the parameters for changes that may occur. The method does not require that a particular system be set up for the calibration, and it does not require a team of technical experts to perform field calibrations. With this method, the wireless terminals that have unobstructed reception of global positioning system signals are used to determine an estimate of the pilot phase offset time delay parameters which are then used to update previously obtained parameters in the database. The estimated pilot phase offset time delay parameter is then used to calibrate the pilot phase offset measurements applied to fix the position of a wireless terminal that does not have unobstructed GPS signal reception.

18 Claims, 5 Drawing Sheets

U.S. PATENT DOCUMENTS

| | | | | |
|---|---|---|---|---|
| 5,717,406 A | | 2/1998 | Sanderford et al. | 342/457 |
| 5,982,324 A | * | 11/1999 | Watters et al. | 342/357 |
| 6,026,304 A | | 2/2000 | Hilsenrath et al. | 455/456 |
| 6,108,558 A | * | 8/2000 | Vanderspool, II | 455/456 |
| 6,188,354 B1 | * | 2/2001 | Soliman et al. | 342/387 |
| 6,289,280 B1 | * | 9/2001 | Fernandez-Corbaton et al. | 701/214 |
| 6,408,186 B1 | * | 6/2002 | Park et al. | 455/466 |

OTHER PUBLICATIONS

"Time Dispoersion Meausrements in Urban Microcellular, Environments," A. A. Arowojolu, A. M. D. Turkmani and J. D. Parsons, Proceedings of the Vehicular Technology Conference, US, New York, IEEE, volumn. CONF. 44, Jun. 8, 1994, pp. 150–154.

* cited by examiner

OBTAINING PILOT PHASE OFFSET TIME DELAY PARAMETER FOR A WIRELESS TERMINAL OF AN INTEGRATED WIRELESS-GLOBAL POSITIONING SYSTEM

RELATED APPLICATION

Related subject matter is disclosed in the following application filed concurrently herewith and assigned to the same assignee hereof: U.S. patent application entitled "Obtaining Round Trip Time Delay Parameter For A Wireless Terminal Of An Integrated Wireless-Global Positioning System", Ser. No. 09/552,897.

FIELD OF THE INVENTION

The present invention relates generally to an integrated wireless-global positioning system and, more particularly, to obtaining and selectively using the pilot phase offset time delay parameter for a wireless terminal of an integrated wireless-global positioning system.

DESCRIPTION OF THE RELATED ART

Global positioning systems, which are satellite based, provide accurate, three dimension position information to worldwide users. FIG. 1 depicts a global positioning system (GPS) 10. The GPS 10 comprises a plurality of satellites 12-j and at least one GPS receiver 14, where j=1,2, ..., n. Each satellite 12-j orbits the earth at a known speed $v_j$ and is separated by a known distance from the other satellites 12-j. Each satellite 12-j transmits a global position signal 11-j which includes a carrier signal with a known frequency f modulated with a unique pseudo-random noise (PN-j) code and navigational data (ND-j) associated with the particular satellite 12-j. The PN-j code includes a unique sequence of PN chips and navigation data ND-j which includes a satellite identifier, timing information and orbital data, such as elevation angle $\alpha j$ and azimuth angle $\phi j$. FIG. 2 depicts a typical 20 ms frame of the GPS signal 11-j which comprises twenty full sequences of a PN-j code in addition to a sequence of navigation data ND-j.

GPS receiver 14 comprises an antenna 15 for receiving GPS signals 11-j, a plurality of correlators 16-k for detecting GPS signals 11-j and a processor 17 having software for determining a position using the navigation data ND-j, where k=1,2, ..., m. GPS receiver 14 detects GPS signals 11-j via PN-j codes. Detecting GPS signals 11-j involves a correlation process wherein correlators 16-k are used to search for PN-j codes in a carrier frequency dimension and a code phase dimension. Such correlation process is implemented as a real-time multiplication of phase shifted replicated PN-j codes modulated onto a replicated carrier signal with the received GPS signals 11-j, followed by an integration and dump process.

In the carrier frequency dimension, GPS receiver 14 replicates carrier signals to match the frequencies of the GPS signals 11-j as they arrive at GPS receiver 14. However, due to the Doppler effect, the frequency f at which GPS signals 11-j are transmitted changes an unknown amount $\Delta f_j$ before the signal 11-j arrives at the GPS receiver 14. Thus, each GPS signal 11-j will have a frequency $f+\Delta f_j$ when it arrives at the GPS receiver 14. To compensate for the Doppler effect, GPS receiver 14 replicates the carrier signals across a frequency spectrum $f_{spec}$ ranging from $f+\Delta f_{min}$ to $f+\Delta f_{max}$ until the frequency of the replicated carrier signal matches the frequency of the received GPS signal 11-j, wherein $\Delta f_{min}$ and $\Delta f_{max}$ are a minimum and maximum change in the frequency the GPS signals 11-j will undergo due to the Doppler effect as they travel from satellites 12-j to GPS receiver 14, i.e., $\Delta f_{min} \leq \Delta f_j \leq \Delta f_{max}$.

In the code phase dimension, GPS receiver 14 replicates the unique PN-j codes associated with each satellite 12-j. The phases of the replicated PN-j codes are shifted across code phase spectrums $R_j(spec)$ until the replicated carrier signals modulated with the replicated PN-j codes correlate, if at all, with the GPS signals 11-j being received by the GPS receiver 14, where each code phase spectrum $R_j(spec)$ includes every possible phase shift for the associated PN-j code. When the GPS signals 11-j are detected by the correlators 16-k, GPS receiver 14 extracts the navigation data ND-j from the detected GPS signals 11-j and uses the navigation data ND-j to determine a location for the GPS receiver 14.

A GPS enables a ground based receiver to determine its position by measuring the time difference required for GPS signals initiated from two or more satellites to be received by a wireless terminal. The pseudorange is defined as this time difference times the speed of light. The pseudorange is not the real range because it contains errors caused by the receiver clock offset. To determine a two-dimensional position (latitude and longitude) usually requires receiving signals from three satellites. To determine a three-dimensional position (latitude, longitude, and altitude) requires receiving pseudoranges from four or more satellites. This precondition, however, may not always be satisfied, especially when the direct satellite signals are obstructed, such as when a wireless terminal is inside a building.

GPS receivers are now being incorporated into wireless telephones or other types of mobile communication devices which do not always have a clear view of the sky. In this situation, the signal-to-noise ratios of GPS signals 11-j received by GPS receiver 14 are typically much lower than when GPS receiver 14 does have a clear view of the sky, thus making it more difficult for GPS receiver 14 to detect the GPS signals 11-j.

Integrated wireless-global positioning (WGP) systems were developed to facilitate the detection of GPS signals 11-j by GPS receivers. The WGP system facilitates detection of GPS signals 11-j by reducing the number of integrations to be performed by correlators searching for GPS signals 11-j. The number of integrations is reduced by narrowing the frequency range and code phase ranges to be searched. Specifically, the WGP system limits the search for GPS signals 11-j to a specific frequency or frequencies and to a range of code phases less than the code phase spectrum $R_j(spec)$.

The position of a wireless terminal may also be determined from information obtained from a wireless network. The information typically includes pilot phase offset (PPO) signals. The PPO measurement contains the information of the distance between the wireless terminal and the BS. Pilot phase offset is the measurement of the code phase in a pilot signal. It consists of information of the distance between the wireless terminal and the BS plus a bias that is the same for all pilot phase offset (PPO) measurements from any one base station. If pilot phase offset measurements from two BSs are available, two pilot phase offset measurements can be used to construct one pilot phase offset measurement by subtracting one pilot phase offset measurement from the other. The subtraction cancels out the unknown constant, and so the PPO measurement is the distance from the wireless terminal to one BS minus the distance from the wireless terminal to the other BS. If three of more PPO measurements are available, the 2D position of a wireless terminal may also be determined from triangulation schemes. One problem with using wireless network based signals to determine the location of a wireless terminal is that the measurement errors of the PPO is usually much larger than the satellite based navigational system measurement errors. Another problem is that three or more measurements may not always be available for the purpose of position determination.

An integrated wireless-global positioning (WGP) system relies on both the satellite navigation system and the wireless communication system to determine the location of a wireless terminal. The integrated wireless-global positioning system combines the data from both the wireless network and the satellites navigation system to obtain an integrated position solution. By combining information from both the global positioning system and the wireless network, it is possible to increase the positioning accuracy and, at the same time, overcome the requirement of having at least three measurements.

FIG. 3 depicts an integrated wireless global positioning system 20 comprising a WGP server 22, a plurality of base stations 23 and at least one WGP client 24. WGP server 22 includes a GPS receiver 26 having an antenna 27 installed in a known stationary location with a clear view of the sky. WGP server 22 is operable to communicate with base stations 23 either via a wired or wireless interface. Each base station 23 is at a known location and provides communication services to WGP clients located within a geographical area or cell 25 associated with the base station 23, wherein each cell 25 is a known size and may be divided into a plurality of sectors. WGP client 24 includes a GPS receiver 28 and perhaps a wireless terminal such as a wireless telephone 29, and is typically in motion and/or at an unknown location with or without a clear view of the sky.

FIG. 4 is a flowchart 300 illustrating the operation of WGP system 20. In step 310, WGP server 22 detects a plurality of satellites 12-j via their GPS signals 11-j using its GPS receiver 26. WGP server 22 acquires the following information from each detected satellite 12-j: the identity of satellite 12-j and frequency $f_j$, code phase, elevation angle $\alpha_j$ and azimuth angle $\phi_j$ associated with the detected satellite 12-j, wherein the elevation angle $\alpha_j$ is defined as the angle between the line of sight from WGP server 22 or client 24 to a satellite 12-j and a projection of the line of sight on the horizontal plane, and the azimuth angle $\phi_j$ is defined as the angle between the projection of the line of sight on the horizontal plane and a projection of the north direction on the horizontal plane. See FIG. 5, which depicts an elevation angle $\alpha_j$ and an azimuth angle $\phi_j$ corresponding to a satellite 12-j and a WGP server 22 or WGP client 24.

In step 315, WGP server 22 receives sector information from base station 23 currently in communication with or serving WGP client 24, wherein the sector information indicates the sector WGP client 24 is currently located. In step 320, WGP server 22 makes an initial estimate of WGP client's position based on the known location of the serving base station, the cell size associated with the serving base station, and the sector in which WGP client 24 is currently located. In one embodiment, WGP server 22 initially estimates that WGP client 24 is located at a reference point within the sector, e.g., point at approximate center of sector. In another embodiment, WGP server 22 initially estimates WGP client 24's position using known forward link triangulation techniques.

In step 330, for each detected satellite 12-j, WGP server 22 uses the information acquired from the detected GPS signals 11-j to predict a frequency $f_j(r)$ at the reference point and a code phase search range $R_j(\text{sect})$ which includes all possible code phases for GPS signal 11-j arriving anywhere within the sector where WGP client 24 is currently located. In step 340, WGP server 22 transmits a search message to the serving base station 23, where the search message includes, for each detected satellite 12-j, information regarding the associated PN-j code, predicted frequency $f_j(r)$ and code phase search range $R_j(\text{sect})$.

In step 350, serving base station 23 transmits the search message to WGP client 24 which, in step 360, begins a parallel search for the satellites 12-j indicated in the search message. Specifically, WGP client 24 will use its correlators to simultaneously search for each of the GPS signals 11-j at the predicted frequency $f_j(r)$ within the limitations of the code phase search range $R_j(\text{sect})$ indicated in the search message.

The performance of an integrated wireless-global positioning system depends directly on the quality and accuracy of the information received from the satellite and the wireless network, namely, the pseudoranges, the PPO, etc. Unfortunately, these measurements are normally noisy and frequently contain relatively large bias errors. This is particularly true for wireless network measurement signals which frequently have measurement errors, a large portion of which are biases. The biases are defined as time delays which occur during the transmission and processing of signals and will normally vary for each sector, for each base station, and for each type and model of wireless terminal being used. Accurately estimating and calibrating these time delays is important for the successful operation of an integrated wireless-global positioning system.

For small scale network systems in which only several base stations/wireless terminals are involved, a system can be setup to calibrate the time delays for each base station and/or wireless terminal for a GPS. One approach is to measure the individual time delays of each wireless terminal, the base station, and the multipath separately. This approach requires a large team of technically trained people equipped with precise and expensive instruments to measure the delays for each type of wireless terminal in each sector of each base station. This approach is costly, time consuming, and if not done with great care, could result in poor performance. However, the process of actually calibrating the time delays for each base station is not feasible for large scale commercial network systems where hundreds of base stations and dozens of different types of wireless terminals are involved.

Another approach is to estimate the network delay parameters based on the wireless network and satellite measurements. A system is established to estimate and adjust the time delay parameters, and then store this information in a database. Once the database of the time delay parameters is established, it is used to assist in determining the location of wireless terminals whose positions are not known. The estimation of the time delay parameters for a wireless terminal/cell sector pair involves typically the following steps:

(1) Setup the wireless terminal to be calibrated at a location where it has an unobstructed reception of satellite signals and wireless network signals in the main antenna beam direction of the cell sector to be calibrated. The location should not be too far from the base station to avoid the multipath influence; and should not be too close to the base station to avoid the problem that the wireless terminal might be locked onto the wrong signal peak instead of the main signal peak.

(2) Survey the location to get the precise coordinates of the wireless terminal. If the coordinates of the base station antenna are unknown, they should be determined. The coordinates of the wireless terminal should be accurate to several meters or better. The positioning accuracy of a commercial differential GPS can typically be one meter or better.

(3) Collect a large number of network and satellite measurements. To have a unobstructed statistical estimate of the time delay parameters, more than one hundred samples should be collected.

(4) Calculate the time delay parameters based on the known positions of the wireless terminals and the base station, and the collection network and satellite measurements.

(5) Adjust or store the time delay parameters in the database in terms of new estimates. The database stores the time delay information for each type of wireless terminal, and also for each cell sector of every base station.

Clearly, the above noted prior art procedure is both costly and time consuming. It requires going through the same procedures to calibrate each type of wireless terminal of each sector for every base station. Because of the time constraints and cost involved for each calibration, the number of the samples that can be obtained is quite limited which, in turn, effects the accuracy of the result obtained. Furthermore, with this calibration process, hardware/software changes which occur within the network and the wireless terminal could require that the calibration process be repeated. Therefore, the above noted calibration process is suitable only for small-scale wireless network systems having only several base station/wireless terminals. It is not practical for large scale commercial network systems where hundreds of base stations and dozens of different types of wireless terminals must be calibrated.

Accordingly, a need exists for a method of automatically obtaining the PPO time delay parameters for wireless terminals in an integrated wireless-global positioning system and, thereafter, selectively using the PPO time delay parameter to determine the position of a wireless terminal which does not have unobstructed reception of the satellite signals.

SUMMARY OF THE INVENTION

An integrated wireless-global positioning (WGP) system determines the location of a wireless terminal from satellite measurements and wireless network measurements. The accuracy of the location identified is dependent upon the quality of the measurement from the wireless network which, unfortunately, can contain measurement errors such as biases. Biases are caused by time delays which occur during the processing and transmission of signals. The time delays vary for each sector/base station and for each type of wireless terminal model being used. Calibration of the biases is important for the success of the WGP system. In this invention there is disclosed a method for using the WGP system to automatically determine the pilot phase offset time delay parameters (biases) and to adaptively adjust the parameters for changes that may occur. The method does not require that a particular system be set up for the calibration, and it does not require a team of technical experts to perform field calibrations. With this method, the wireless terminals that have unobstructed reception of GPS signals are used to obtain pilot phase offset time delay parameters and to then use the time delay parameter to calibrate the pilot phase offset measurements when determining the position of a wireless terminal that does not have unobstructed GPS signal reception.

DETAILED DESCRIPTION OF THE PREFERRED EMBODIMENT

Figure 1:
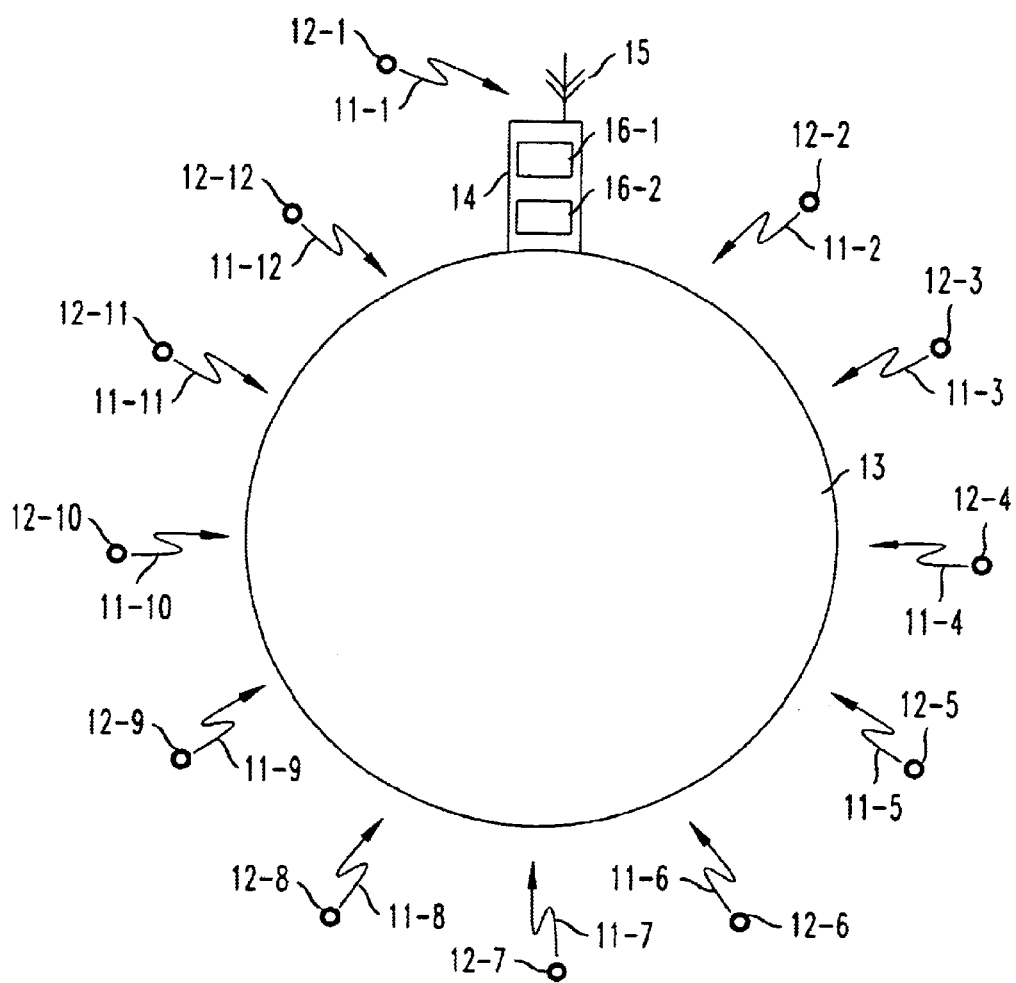
FIG. 1 depicts a prior art satellite-based navigational system referred to as global positioning system (GPS)
Figure 2:
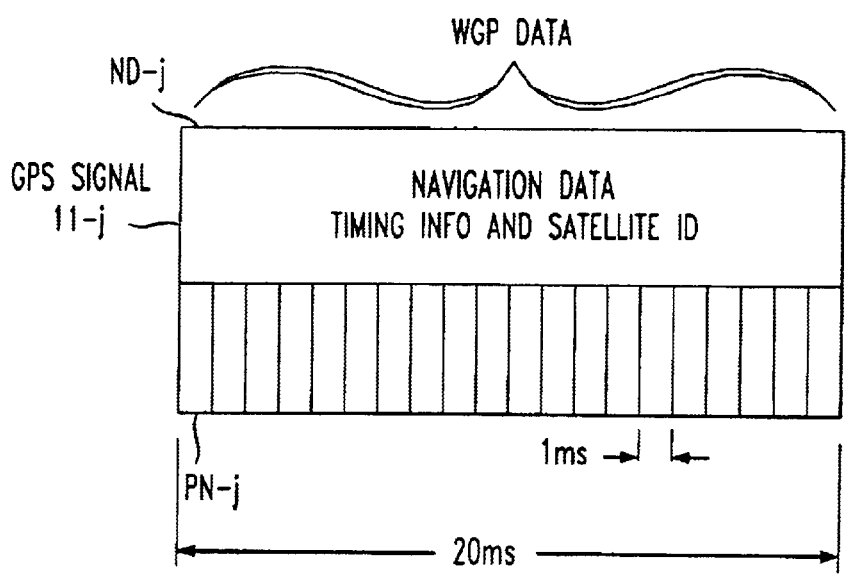
FIG. 2 depicts a typical 20 ms frame of a GPS signal.
Figure 3:
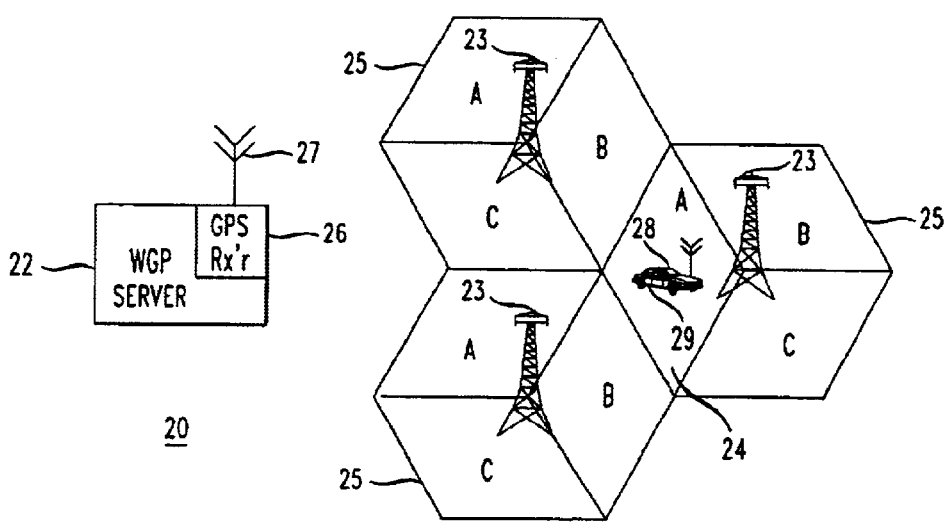
FIG. 3 depicts an integrated wireless-global positioning system.
Figure 4:
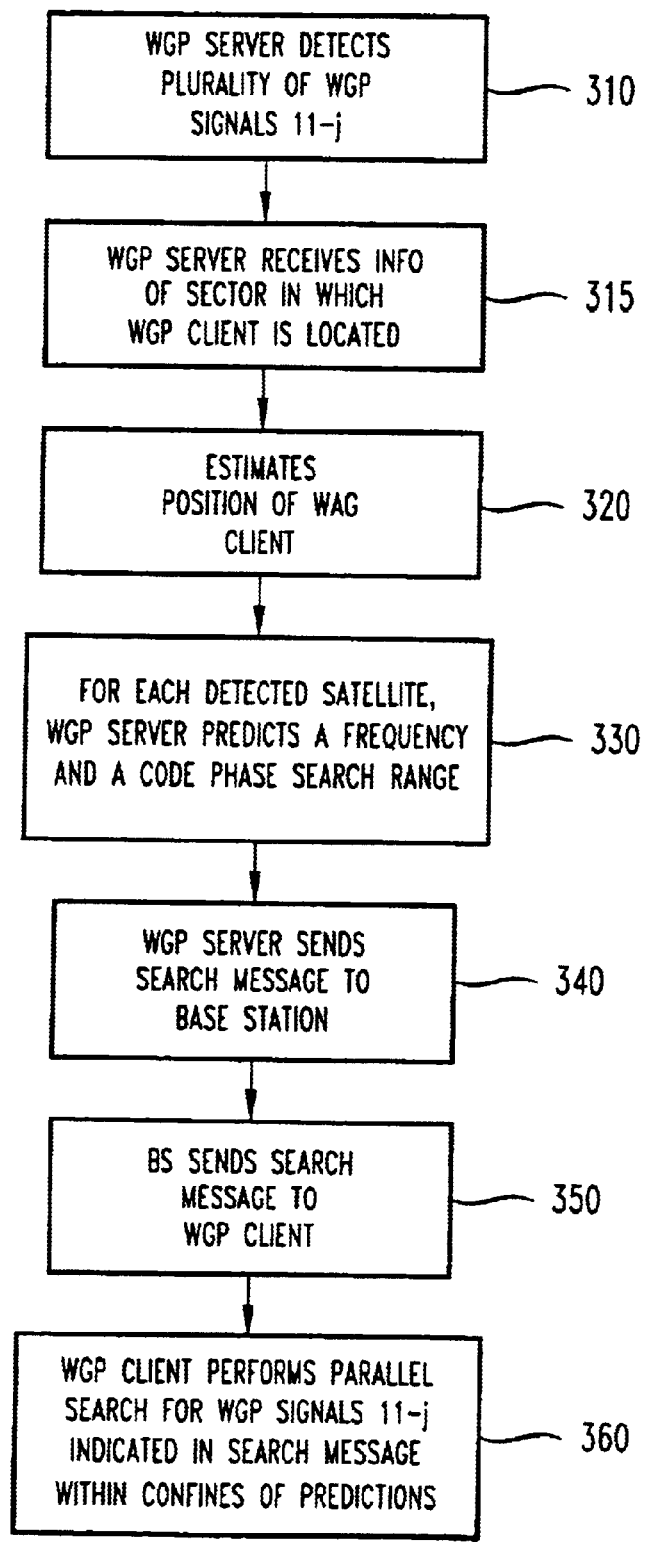
FIG. 4 depicts a flowchart illustrating the operation of the integrated wireless-global positioning system of FIG. 3.
Figure 5:
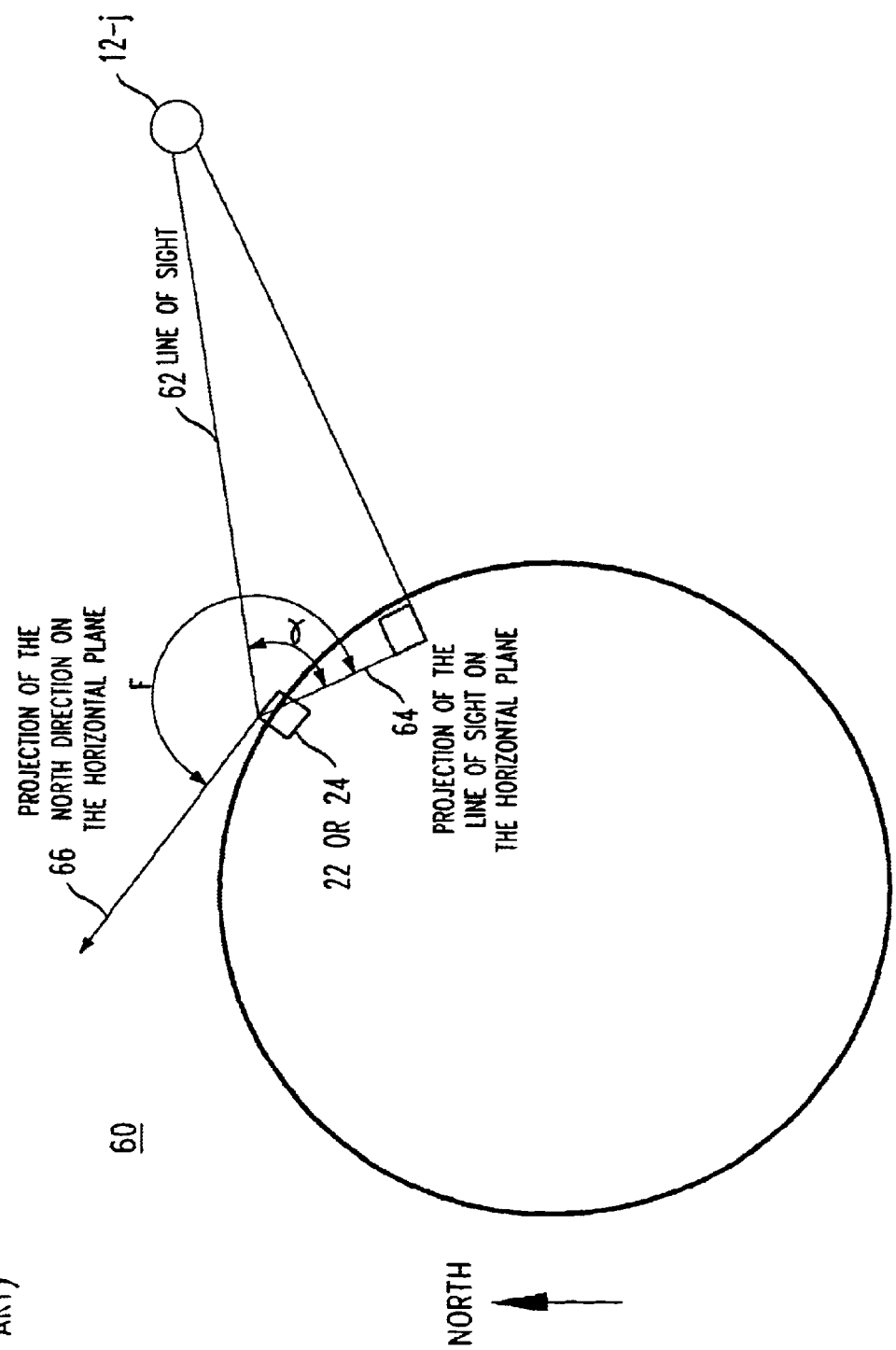
FIG. 5 illustrates an elevation angle and an azimuth angle corresponding to a satellite and a wireless global positioning system client.

As noted previously, a satellite navigation system, such as the global positioning system, comprises a constellation of satellites that transmit satellite signals that can be used by a wireless terminal to determine the position of the wireless terminal. The position of a wireless terminal on earth is determined by the time differences required for global positioning system (GPS) signals initiated at the various satellites to be received by the wireless terminal. To determine a two dimensional position (latitude and longitude) usually requires receiving signals from three satellites. To determine a three dimensional position (latitude, longitude, and altitude) usually requires receiving signals from four or more satellites. This precondition, however, may not always be satisfied, especially when the satellite signals are obstructed and cannot be received directly by a wireless terminal such as when the wireless terminal is in a building. The position of a wireless terminal may also be determined by the use of pilot phase offset (PPO) information from the wireless network. The PPO is the measurement of the code phase in a pilot signal. It consists of information of the distance between the wireless terminal and the base station plus a constant bias that is the same for all pilot phase offset measurements from any one base station. If three of more PPO measurements are available, the two dimension position of a wireless terminal may also be determined from triangulation calculations. One problem of relying on the wireless network based signal information to determine the position of a wireless terminal is that the measurement errors of PPO signals are usually much larger than satellite based navigational system measurement errors. Another problem is that three of more measurements may not always be available to determine the position of a wireless terminal.

An integrated wireless-global positioning system relies of information from both the satellite system and the wireless communication system to determine the location of a wireless terminal. By combining information from both the GPS and the wireless network, the positioning accuracy may be increased and the requirement of obtaining at least three measurements may not be necessary.

Needless to say, the performance of the WGP system depends directly of the quality of the received satellite signals and wireless network measurements, such as the pseudoranges and the pilot phase offset delay measurements. These wireless network measurements can be noisy and have large bias errors. This is especially true for the wireless network measurements that normally contain measurement errors with large portion of them being biases. The biases are caused by time delays which occur during the transmission and processing of signals. The time delays vary for each sector/base station and for each type of wireless terminal model being used. Accurately estimating and calibrating these time delays is necessary to avoid the generation of large positioning errors.

Wireless network measurements which include pilot phase offset (PPO) measurements contain errors which consists of slow and fast changing components. The slow changing component, which is caused by signal transmission and processing time delays is usually expressed as bias. The fast changing component appears as noise. The bias component, which is usually much larger than the noise, should be calibrated. The noise component, which cannot be calibrated, may be smoothed out by other techniques, one such technique being an averaging method.

The pilot phase offset delay measurement for a wireless terminal i, located in a sector j in a base station k can be expressed as:

$$y_{ijk}^{ppo} = \frac{d_{ik}}{c} + a_i^{ppo} + b_{ijk}^{ppo} + e_{ijk}^{ppo} \qquad (1)$$

where the superscript 'ppo' of an item indicates that it relates to the pilot phase offset. The subscripts "i", "j", and "k" represent that the item relates to the wireless terminal i in the sector j of the base station k, respectively. Additionally, d is the distance from the mobile terminal to the base station, c is the speed of light, b is the bias measurement, e is the noise measurement, and a is an unknown constant that is the same for all PPO measurements relative to the wireless terminal i.

Equation 1 shows that the pilot phase offset bias measurement $y_{ijk}^{ppo}$ consists of the distance $d_{ik}$ from the mobile terminal to the base station (divided by the speed of light to obtain the dimension of time) plus the bias $b_{ijk}^{ppo}$, the noise $e_{ijk}^{ppo}$ and a constant $a_i^{ppo}$. Although the noise $e_{ijk}^{ppo}$ may be smoothed out by averaging techniques, the bias $b_{ijk}^{ppo}$ cannot be removed by averaging techniques. It is usually much larger than the noise and has to be estimated or calibrated. The bias b is mainly caused by hardware/software delays in the signal transmission and processing from the mobile terminal, base station and possibly from the path. An estimation of the bias $b^{ppo}$ cannot be obtained directly from the PPO measurements because of the unknown constant $a^{ppo}$. Averaging multiple PPO measurements will only result in an estimate of $b^{ppo}$ plus $a^{ppo}$, it will not result in $b^{ppo}$ alone. Therefore, other information is required to obtain an estimate of $b^{ppo}$. The information to be used for estimating the value $b^{ppo}$ is the wireless terminal timing bias $b^{time}$, which can be expressed as:

$$b_{ij}^{time} = \frac{d_{ik}}{c} + b_{ij}^{ppo} \qquad (2)$$

where the superscript 'time' of an item represents that the item is related to the wireless terminal timing bias $b^{time}$ and $d_{ik}$ is the distance from the wireless terminal to the base station. Although the true timing bias $b_{ij}^{time}$ is not known, it can be accurately estimated along with the wireless terminal position provided the wireless terminal has good reception of the GPS signals. The estimated timing bias $b_{ijk}^{time}$ can be expressed as $$b_{ij}^{time} = b_{ij}^{GPS} + e_{ij}^{GPS} \qquad (3)$$

where $b_{ij}^{GPS}$ is the estimated time bias based on the GPS information, and the error item $e_{ij}^{GPS}$ includes the errors in the estimation of the timing bias.

Figure 6:
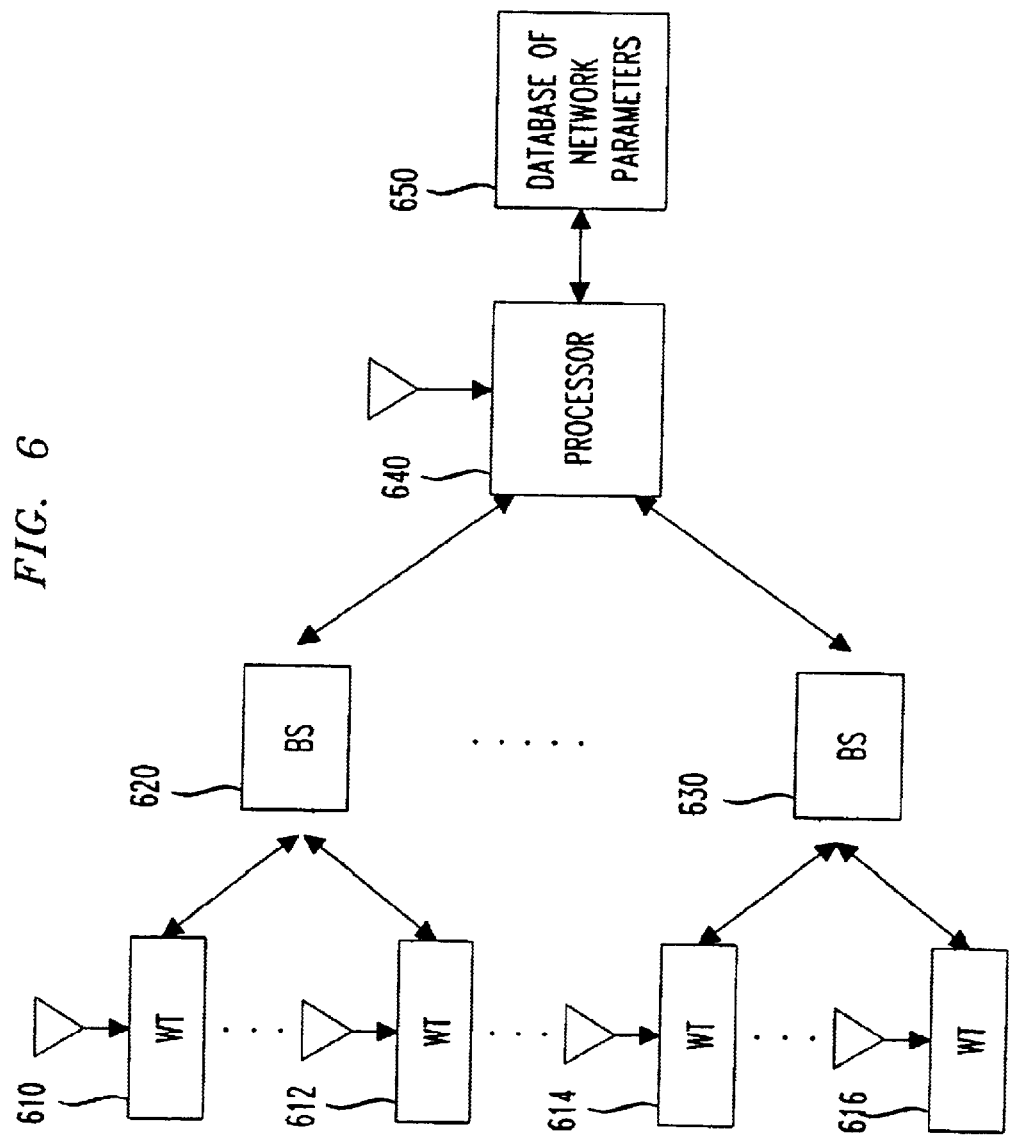
FIG. 6 is a block diagram for estimating time delay parameters, namely, the pilot phase offset time delay parameter of an integrated wireless global positioning system in accordance with the principles of the invention.

Referring to FIG. 6, there is illustrated a block diagram for determining an estimate of the pilot phase offset time delay parameter for wireless terminals positioned to receive unobstructed signals from GPS satellites. This parameter is used in determining the position of wireless terminals that are not positioned to receive unobstructed signals from GPS satellites. The determination of the estimation of the time delay parameters and the application of the estimated values to calibrate the delays are performed in parallel. For a commercial wireless network there can be thousands of wireless terminals (WT) 610, 612, 614, 616 distributed throughout an entire network that is served by dozens of base stations (BS) 620 . . . 630.

Some of the wireless terminals have excellent reception of global positioning system (GPS) signals and wireless network signals, while others may be located where the GPS signals are partially or completely blocked by obstructions. For those wireless terminals that have excellent GPS reception, there is no need to use the time delay parameters of the wireless network for position computation. The accuracy obtained by using the GPS signals received directly from the satellites is usually better than 10 meters for each position fix.

In this invention, information signals from those terminals that have excellent reception of the GPS signals are fed to a processor 640 which provides an estimate of the pilot phase offset delay parameters of the wireless network, the output of which is used to update the database 650 with the delay parameters. The estimated parameters are then used as the pilot phase offset time delay parameter for wireless terminals that do not have unobstructed reception of global positioning system signals from the satellite and, therefor, need to use wireless network data as opposed to GPS signals to determine a position fix for the wireless terminal.

To automatically estimate the pilot phase offset delay parameter for each particular wireless terminal model located in a particular cell sector for a base station, all of the measurements from the wireless terminals that meet the following conditions should be used: 1) the same model type; 2) served by the same cell sector of the same base station, and 3) having unobstructed reception of GPS signals. The first condition can be determined by checking the equipment serial number reported from the wireless terminal. Each terminal has a unique equipment serial number which can be linked to the model type by a database which identifies the equipment serial number with the wireless terminal model The second condition can be established with software which links each wireless terminal with a pseudorandom number. The last condition can be established by determining both the number of satellites the wireless terminal detects and the signal to noise ratio of each detected satellite signal. From Equations (2) and (3), we have $$b_{ij}^{ppo} = b_{ij}^{GPS} - \frac{d_{ik}}{c} + e_{ij}^{GPS} \qquad (4)$$

The last term in the above equation can be regarded as a zero-mean noise error. Therefore, if in sector j of a common base station, the total number of wireless terminals of type i, which have unobstructed reception of satellite signals is $N_{ij}$ then the estimated PPO time delay can be expressed as follows:

$$\hat{b}_{ij}^{ppo} = \frac{1}{N_{ij}} \sum_{n=1}^{N_{ij}} \left( b_{ij}^{GPS} - \frac{\hat{d}_{ik}}{c} + e_{ij}^{GPS} \right)_n \quad (5)$$

$$\hat{b}_{ij}^{ppo} \approx \frac{1}{N_{ij}} \sum_{n=1}^{N_{ij}} \left( b_{ij}^{GPS} - \frac{\hat{d}_{ik}}{c} \right)_n \quad (6)$$

where $\hat{d}_{ik}$ is the estimated distance from the wireless terminal to the base station and $b_{ij}^{GPS}$ is the estimated time bias based on GPS information.

The estimated distance $\hat{d}_{ik}$ between the wireless terminal and the base station can be determined from the location of the wireless terminal, which is obtained from the GPS, and the location of the base station which is known and contained in a database. The time bias of the GPS $b_{ij}^{GPS}$ is obtained from signals received by the wireless terminal from the GPS satellites. When a GPS signal is detected, the phase of the replicated codes, or the start time of the replicated pseudonunmber codes that maximizes the correlator output can be determined. The satellite clock time at the time of transmission is embedded in the satellite signal received by the wireless terminal. Subtracting the satellite clock time from the start time of the wireless terminal's maximally correlating replicated code, and then multiplying the resultant by the speed of light will give the measured pseudorange. But, because of the presence of time biasb$_{ij}^{GPS}$ in the clock of the wireless terminal, the value of the pseudorange obtained will not be the real distance from the wireless terminal to the satellite; it will actually be the sum of the true distance plus the distance due to the wireless clock bias.

For a wireless terminal that has unobstructed reception of GPS signals, it normally obtains pseudorange measurements from four or more satellites. Obtaining four or more pseudorange measurements allows one to determine the unknown three dimensional position of the wireless terminal, which contains three unknown coordinates, and the terminal time bias $b_{ij}^{GPS}$ using well known GPS navigation algorithms. The wireless terminal time bias obtained is the value $b_{ij}^{GPS}$ that is used in relationship (5) or (6).

Once the measurements for the wireless terminals of the same model type that are located in a common sector and have unobstructed reception of satellite signals are obtained, they are grouped together according to expression (5) or (6) to obtain the estimated PPO time delay parameter. It is here noted that the estimated PPO parameter is obtained directly from four or more satellites and the position of the wireless terminal and that expensive time consuming procedures of the prior art are avoided.

In equation (5) or (6), the estimate of the pilot phase offset parameter is calculated after grouping together a large number of measurement samples. The greater the number of samples obtained, the more accurate the results. The equation can also be changed to other forms for the estimation of the pilot phase offset time delay. For example, if we want to continuously update the estimate of the pilot phase offset time delay parameter by the use of the previously estimated value and a new input data without recalculate the total sum, the following algorithm can be applied:

$$\hat{b}_{ij}^{ppo}(m+1) = x_1 \hat{b}_{ij}^{ppo}(m) + x_2 \left( b_{ij}^{GPS} - \frac{\hat{d}_{ik}}{c} \right) \quad (7)$$

where ($x_1 \geq 0$, $x_2 \geq 0$, $x_1 + x_2 = 1$)

In expression (7), $\hat{b}_{ij}^{ppo}(m+1)$ and $\hat{b}_{ij}^{ppo}(m)$ represent, respectively, the new updated estimate and the estimate in the previous step m. The value of $x_1$ can be assigned a value that varies from 0 to 1.0, and $X_2$ can be assigned a value that varied between 0 and 1.0, provided $x_1$ plus $x_2$ equals 1. $x_1$ is associated with the prior obtained PPO delay value, and $x_2$ is associated with the current PPO delay value. Therefore, the PPO delay parameter will be updated in slow increments when x, is large relative to $x_2$ and the PPO delay parameter will be updated rapidly when $x_1$ is small relative to $x_2$.

Although the present invention has been described in terms of the presently preferred embodiments, it is to be understood that the disclosure is not to be interpreted as limiting. Various alternatives and modifications will no doubt become apparent to those skilled in the art after having read the above disclosure. Accordingly, it is intended that the appended claims be interpreted as covering all alterations and modifications that fall within the spirit and scope of the invention.

What is claimed is:

1. A method for calibrating timing data in a wireless communication system having at least one base station and at least one mobile station, the method comprising the steps of:
   autonomously collecting position information for mobile stations having unobstructed reception of signals from a position determination system independent of the wireless communication system, and using said position information to determine a distance of at least one of the mobile stations from a known location; and
   using the distance determined for the at least one mobile station to calibrate a distance related timing parameter determined for a mobile station having an obstructed reception of signals from the independent position determination system.

2. The method of claim 1 wherein said known location is a location of a serving base station for said at least one mobile station.

3. The method of claim 1 wherein said distance related timing parameter is a Pilot Phase Offset parameter.

4. The method of claim 1 wherein said distance related timing parameter is uniquely determined for a mobile station of a given equipment type and a serving base station for the mobile station of a given equipment type.

5. The method of claim 1 wherein said distance related timing parameter is uniquely determined for a mobile station of a given equipment type and a specified sector of a serving base station for the mobile station of a given equipment type.

6. The method of claim 1 wherein the step of autonomously collecting position information is carried out during normal operation of the wireless communication system.

7. The method of claim 1 wherein the position determination system independent of the wireless communication system comprises a plurality of Global Positioning System satellites.

8. A method for determining a location for a mobile station in a wireless system having at least one base station serving at least one mobile station, the method comprising the steps of:
   autonomously collecting position information for mobile stations having unobstructed reception of signals from a position determination system independent of the wireless communication system, and using said position information to determine a distance of at least one of the mobile stations from a known location;
   determining a distance related timing parameter for at least two communications paths terminating at a mobile station having an obstructed reception of signals from the independent position determination system;

applying distance data obtained in said autonomous collecting step to calibrate said distance related timing parameter determined for each said at least two communication paths; and determining a location of said mobile station having an obstructed reception as a geometric resultant of distance information derived from said calibrated distance related timing parameters.

9. The method of claim 8 wherein said known location is a location of a serving base station for said at least one mobile station.

10. The method of claim 8 wherein said distance related timing parameter is a Pilot Phase Offset parameter.

11. The method of claim 8 wherein said distance related timing parameter is uniquely determined for a mobile station of a given equipment type and a serving base station for the mobile station of a given equipment type.

12. The method of claim 8 wherein said distance related timing parameter is uniquely determined for a mobile station of a given equipment type and a specified sector of a serving base station for the mobile station of a given equipment type.

13. The method of claim 8 wherein the step of autonomously collecting position information is carried out during normal operation of the wireless communication system.

14. The method of claim 8 wherein the position determination system independent of the wireless communication system comprises a plurality of Global Positioning System satellites.

15. A system for calibrating timing data in a wireless communication system having at least one base station and at least one mobile station, the system for calibrating comprising:

means for autonomously collecting position information for mobile stations having unobstructed reception of signals from a position determination system independent of the wireless communication system, and using said position information to determine a distance of at least one of the mobile stations from a known location; and processing means operative to calibrate a distance related timing parameter determined for a mobile station having an obstructed reception of signals from the independent position determination system based on the distance determined for, the at least one mobile station.

16. The method of claim 15 wherein said known location is a location of a serving base station for said at least one mobile station.

17. The method of claim 15 wherein said distance related timing parameter is a Pilot Phase Offset parameter.

18. The method of claim 15 wherein the autonomous collection of position information is carried out during normal operation of the wireless communication system.

* * * * *